United States Patent Office 2,897,215
Patented July 28, 1959

2,897,215
METHOD OF ISOLATING AND PURIFYING KETO STEROIDS AND NEW KETO STEROID COMPOUNDS

Leon Velluz, Paris, France, assignor to Les Laboratoires Français de Chimiothérapie, Paris, France, a French body corporate No Drawing. Application April 20, 1956
Serial No. 579,458

Claims priority, application France December 11, 1952

14 Claims. (Cl. 260—397.4)

The present invention relates to a method of purifying and isolating keto steroids and more particularly to an improved method of selectively separating cis-testosterone from trans-testosterone.

The present application is a continuation-in-part of my co-pending application Serial No. 336,630, now U.S. Patent No. 2,749,356, filed February 6, 1953, and entitled Method of Isolating and Purifying Keto Steroids and New Keto Steroid Compounds.

It is known that a very important advance in the art was made by suggesting to separate keto steroids from accompanying non-keto steroids by reacting the keto compounds with ketone reagents. Two of the best known examples of such separation processes are the isolation of the semicarbazone of trans-dehydroandrosterone, an important intermediate product in the synthesis of testosterone, from neutral cholesterol oxidation products, and the isolation of estrone from the urine of pregnant mares by means of the "reagents T and P" of Girard and Sandulesco. Reagents T and P permit the conversion of ketones into water soluble compounds in the form of hydrazones with quaternary ammonium residues.

The semicarbazones, however, are practically almost insoluble and, therefore, do not permit any fractionation of the keto steroids. The Girard and Sandulesco reagents produce excellent results either on account of the different speed of reaction of various hormones therewith, or on account of the differences in hydrolysis of such reaction products, or on account of the different pH-values required for splitting up the hydrazones T or P into their corresponding keto compounds on regeneration therefrom. But the working conditions with these reagents are so delicate that their application is rather restricted and requires rather large volumes of liquids which are cumbersome to handle.

As stated above the semicarbazones are, in general, completely insoluble. This is also true with dinitro phenyl hydrazones which are praised as being especially suitable for analytical purposes. These compounds, however, can be hydrolyzed only with difficulty. The oximes, other classic keto derivatives, are usually too soluble.

The heretofore used ketone reagents have the further disadvantage that they do not possess sufficiently selective reactivity with various keto steroids and that, therefore, they do not effect satisfactory separation of the most desired keto steroids.

It is one object of the present invention to provide a ketone reagent which allows selective precipitation of cis-testosterone alone from a mixture of trans- and cis-testosterone as it is obtained, for instance, on recrystallizing testosterone while trans-testosterone remains in the starting solution.

Another object of the present invention is to provide a new ketone derivative of cis-testosterone which can readily be hydrolyzed to cis-testosterone.

Further objects of this invention will become apparent from the specification and the examples given therein.

The present invention consists in principle in using as ketone reagent for selectively precipitating reaction products of said ketone reagent with cis-testosterone from suitable starting materials and solutions, the hydrazide derived from diphenyl glycolic acid, also called benzilic acid. Said hydrazide will be designated herein and in the claims annexed hereto as "reagent B." It corresponds to the following formula

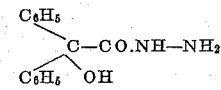

Cis-testosterone reacts with said hydrazide according to the following equation:

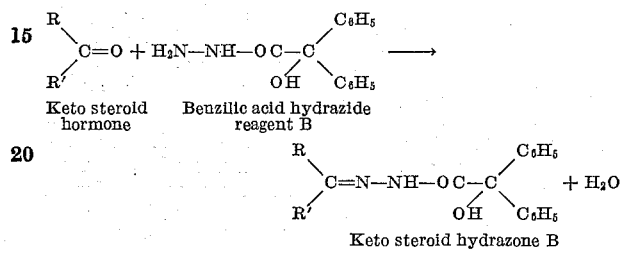

Said hydrazone is only slightly soluble, and, therefore, can readily be collected and separated from the reaction mixture, and is easily split up thereby regenerating the keto steroid component thereof.

Benzilic acid hydrazide is a well known product and is produced according to the method of Curtius, "Journal der praktischen Chemie," 2nd series, volume 95, page 196 (1917).

The hydrazone with cis-testosterone is produced, for instance, by reacting cis-testosterone or a mixture of cis-testosterone and trans-testosterone with said benzilic acid hydrazide in a suitable indifferent solvent, such as a solvent of neutral reaction. It is advisable to add to the mixture a small amount of an organic acid, such as acetic acid, which has a catalytic effect upon the reaction and accelerates the same. It is also possible to react the hydrazide and the keto steroid in pure acetic acid, i.e., without any indifferent solvent. Reaction takes place in the cold, after a more or less prolonged contact of the reaction components, or by heating the reaction mixture under reflux.

Reagent B reacts also with trans-testosterone but forms therewith a hydrazone of higher solubility in the selected solvents than with cis-testosterone.

After filtering off or centrifuging the precipitated cis-testosterone hydrazone B and subsequently recrystallizing said hydrazone, it is hydrolyzed and cis-testosterone is regenerated and recovered. Such regeneration is usually effected by hydrolysis with mineral acids or strong organic acids or by double decomposition and exchange with an aldehyde or a ketone which possesses a much greater affinity to said reagent B than the keto steroid involved, whereby said aldehyde or ketone is preferably used in excess of the required amount in order to cause a shift of equilibrium. Benzaldehyde or pyruvic acid, for instance, are especially suitable for such exchange reaction, the latter compound being used advantageously in dilute acetic acid solution.

It is very surprising that such a great difference in solubility exists between the benzilic acid hydrazone of cis-testosterone and that of trans-testosterone, the more so in view of the fact that the hydrazides of quite related acids, namely of mandelic acid and diphenyl acetic acid, do not show such selective solubility. The mandelic acid hydrazones are almost all soluble under the usual reaction conditions when using methanol and ethanol as solvents. The diphenyl acetic acid hydrazones, on the other hand, do not show any differences in solubility; almost all of its hydrazones are insoluble so that no selective precipitation is achieved.

One may proceed, without in any way departing from the principles of this invention, in such a manner that first the mixture of keto steroids is reacted with reagent B in a solvent wherein all the hydrazones B are soluble, whereafter one of the hydrazones B is precipitated by adding another solvent to the solution wherein said particular hydrazone B to be separated is insoluble. One may, of course, also evaporate to dryness the solution of the hydrazones B in a solvent wherein all of them are soluble, and may extract from the evaporation residue by means of another suitable solvent the one or the other of said hydrazones B. In cases in which the desired product contains only one impurity, one may react said impurity with reagent B to eliminate the same. In this manner it is, for instance, possible to separate the hydrazone B of cis-testosterone which is insoluble in methanol, from the hydrazone B of the male sex hormone trans-testosterone which remains dissolved in methanol.

The following examples serve to illustrate this invention and some of the advantageous features thereof will appear from the description of preferred modes of carrying out the invention. It is to be understood, of course, that the invention is not limited to the precise order of steps of the processes set forth, as the invention can be embodied in a plurality and a variety of forms and can be practiced in a plurality and a variety of ways.

Thus one may use other indifferent solvents than those mentioned in the examples, such as isopropanol, dioxane, benzene, as well as other organic acids, alone or mixed, such as formic or tartaric acid.

The melting points giving in the following examples were determined in the maquenne block and indicate the point of instantaneous melting.

EXAMPLE 1

*Hydrazone B of cis-testosterone*

29 g. of cis-testosterone are boiled under reflux in 600 cc. of methanol containing 6 cc. of glacial acetic acid for one hour and 27 g. of reagent B previously dissolved by heating in 250 cc. of methanol are added to said solution. The total volume is 850 cc. The reaction mixture is allowed to stand overnight at room temperature. The precipitate is filtered off, washed with methanol, and dried. 46 g. of hydrazone B of cis-testosterone melting at 185° C., are obtained.

Said hydrazone is hydrolyzed by dissolving 50 g. thereof in 200 cc. of glacial acetic acid containing 20 cc. of pyruvic acid and 10 cc. of water. Splitting up of said hydrazone is effected at room temperature. After a certain period of time crystals separate which are filtered off and washed first with a 5% solution of sodium bicarbonate and then with water. After drying, 26 g. of cis-testosterone are obtained.

EXAMPLE 2

*Separation of cis-testosterone from transtestosterone*

58 g. of a mixture of trans- and cistestosterone as it is obtained on recrystallizing of testosterone, is reacted in the same manner as described in Example 1, with reagent B. 20 g. of hydrazone B of cis-testosterone are obtained. The mother liquors are evaporated to dryness and are hydrolyzed as described in Example 1 whereby 44 g. of a crude product are obtained. On recrystallization, 30.8 g. of pure transtestosterone are obtained therefrom.

Of course, many changes and variations in the reaction conditions, the solvents used, the temperature and duration of the condensation reaction, the methods of isolating, purifying, and working up the hydrazones B, the manner in which said hydrazones B are decomposed and split up to the corresponding ketones and the like may be made by those skilled in the art in accordance with the principles set forth herein and in the claims annexed hereto.

I claim:
1. The benzilic acid hydrazone of cis-testosterone.
2. The benzilic acid hydrazone of transtestosterone.
3. The benzilic acid hydrazones of keto steroids selected from the group consisting of cis-testosterone and trans-testosterone.
4. In a process of purifying and isolating cis-testosterone from a solution containing cis- and trans-testosterone, the steps comprising adding benzilic acid hydrazide to solution, allowing the reaction mixture to stand at room temperature until condensation of said benzilic acid hydrazide with cis- and trans-testosterone is completed, filtering off the precipitated benzilic acid hydrazone of cis-testosterone from the dissolved benzilic acid hydrazone of trans-testosterone, and dissociating, by hydrolysis, the separated benzilic acid hydrazone of cis-testosterone to substantially pure cis-testosterone.
5. The method of purifying and isolating cis-testosterone according to claim 4, wherein the condensation is carried out while heating under reflux.
6. The method of purifying and isolating cis-testosterone according to claim 4, wherein the benzilic acid hydrazide is added to a solution of cis-testosterone and trans-testosterone in a neutral organic solvent selected from the group consisting of lower alkanols, dioxane, and benzene.
7. The method of purifying and isolating cis-testosterone according to claim 6, wherein the condensation is carried out in the presence of an acid agent selected from the group consisting of a lower alkanoic acid and tartaric acid.
8. The method of purifying and isolating cis-testosterone according to claim 7, wherein the acid agent is acetic acid.
9. In a method of purifying and selectively isolating cis-testosterone from a mixture containing cis- and trans-testosterone, the steps comprising dissolving said mixture in methanol containing acetic acid, adding to said solution the hydrazide of benzilic acid, allowing the reaction mixture to stand at room temperature until condensation is completed, separating the precipitated benzilic acid hydrazone of cis-testosterone, reacting said hydrazone in solution in acetic acid with pyruvic acid at room temperature until cis-testosterone is split off and, separating the resulting substantially pure cis-testosterone regenerated thereby.
10. In a process of purifying and isolating cis-testosterone from a solution containing cis- and trans-testosterone, the steps comprising adding benzilic acid hydrazide to said solution, allowing the reaction mixture to stand at room temperature until condensation of said benzilic acid hydrazide with said cis- and trans-testosterone is completed, filtering off the precipitated benzilic acid hydrazone of cis-testosterone from the dissolved benzilic acid hydrazone of trans-testosterone, dissolving said benzilic acid hydrazone of cis-testosterone in a mixture of acetic acid, pyruvic acid in an amount sufficient to dissociate said hydrozone, and a small amount of water, and allowing the resulting mixture to stand at room temperature to cause dissociation of said benzilic acid hydrazone of cis-testosterone and to precipitate substantially pure cis-testosterone.
11. The method of purifying and isolating cis-testosterone according to claim 10, wherein the benzilic acid hydrazide is added to a solution of cis-testosterone and trans-testosterone in methanol.
12. In a process of purifying and isolating trans-testosterone from a solution comprising trans- and cis-testosterone, the steps comprising adding benzilic acid hydrazide to said solution, allowing the reaction mixture to stand at room temperature until condensation of said benzilic acid hydrazide with said trans- and cis-testosterone is completed, filtering off the precipitating benzilic acid hydrazone of cis-testosterone from the dissolved benzilic acid hydrazone of trans-testosterone, evaporating to dryness the remaining solution containing said benzilic acid hydrazone of trans-testosterone, dissociating, by hydrolysis, the resulting benzilic acid hydrazone of trans-testosterone, and recrystallizing the crude trans-testosterone obtained thereby to yield pure trans-testosterone.

13. In a process of purifying and isolating trans-testosterone from a solution containing cis- and trans-testosterone, the steps comprising adding benzilic acid hydrazide to said solution, allowing the reaction mixture to stand at room temperature until condensation of said benzilic acid hydrazide with said cis- and trans-testosterone is completed, filtering off the precipitated benzilic acid hydrazone of cis-testosterone from the dissolved benzilic acid hydrazone of trans-testosterone, evaporating the remaining solution containing the benzilic acid hydrazone of trans-testosterone to dryness, dissolving the resulting product in a mixture of acetic acid, pyruvic acid and a small amount of water in an amount sufficient to dissociate said hydrazone, and allowing the mixture obtained thereby to stand at room temperature to cause dissociation of said benzilic acid hydrazone of trans-testosterone and to precipitate substantially pure trans-testosterone.

14. In a method of purifying and selectively isolating trans-testosterone from a mixture containing cis- and trans-testosterone, the steps comprising dissolving said mixture in methanol containing acetic acid, adding to said solution the hydrazide of benzilic acid, allowing the reaction mixture to stand at room temperature until condensation is completed, filtering off the precipitated benzilic acid hydrazone of cis-testosterone, evaporating the remaining solution to dryness, reacting the resulting product in solution in acetic acid with pyruvic acid at room temperature until trans-testosterone is split off, and isolating the resulting substantially pure trans-testosterone regenerated thereby from the reaction mixture.

References Cited in the file of this patent
UNITED STATES PATENTS

| | | |
|---|---|---|
| 2,200,307 | Schoeller | May 14, 1940 |
| 2,308,834 | Ruzicka | Jan. 19, 1943 |

OTHER REFERENCES

Curtius: Jour. für prakt. Chem. (2nd series), vol. 95, pages 196–198 (1917).

Velluz et al.: Bull. Soc. Chim. (France), 1953, pages 409–410.